(12) United States Patent
Shuen

(10) Patent No.: US 6,672,651 B1
(45) Date of Patent: Jan. 6, 2004

(54) REAR WING STRUCTURE

(75) Inventor: Shun Tian Shuen, San Chung (TW)

(73) Assignee: Janchy Enterprise Co., Ltd. (TW)

( * ) Notice: Subject to any disclaimer, the term of this patent is extended or adjusted under 35 U.S.C. 154(b) by 0 days.

(21) Appl. No.: 10/256,171

(22) Filed: Sep. 27, 2002

(51) Int. Cl.$^7$ .............................................. B62D 35/00
(52) U.S. Cl. ................... 296/180.5; 296/180.1
(58) Field of Search ........................... 296/180.1, 180.5

(56) References Cited

U.S. PATENT DOCUMENTS

| | | | |
|---|---|---|---|
| 5,013,081 A | * | 5/1991 | Cronce et al. ........... 296/180.1 |
| 5,311,412 A | * | 5/1994 | Yang .................... 296/180.1 X |
| 6,520,564 B1 | * | 2/2003 | Liang ....................... 296/180.5 |

* cited by examiner

*Primary Examiner*—Joseph D. Pape
(74) *Attorney, Agent, or Firm*—Bacon & Thomas, PLLC

(57) ABSTRACT

An improved rear wing structure. The structure includes a rear wing and supporting stands. The rear wing is extendible and suitable for different car specifications. Ornaments can be added on both sides of the panel. There are three supporting stands, firmly attached to the middle and the two sides of the panel, which is fixed onto the trunk by screws and adjustable for the optimum angle of depression and elevation for balancing the center of gravity for the car body. The rear wing can be added with ornaments featuring personal style or fashionable decoration.

6 Claims, 18 Drawing Sheets

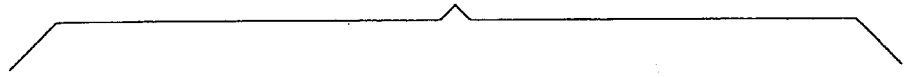
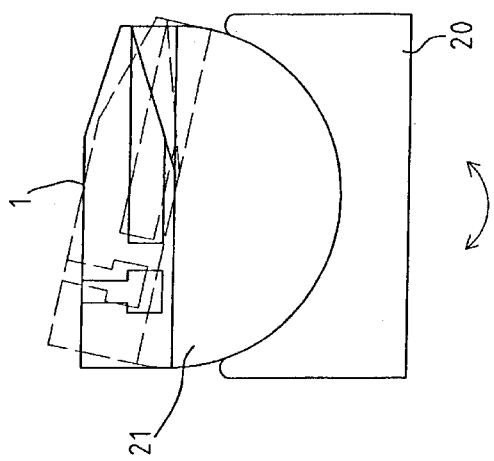
Fig 4B
Fig 5
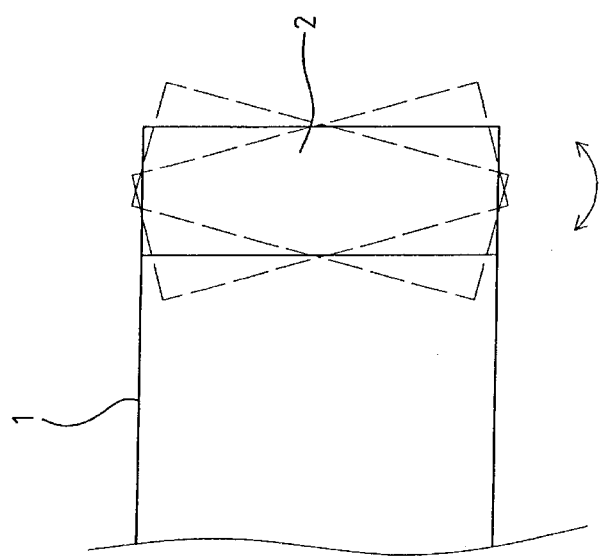
Fig 4A

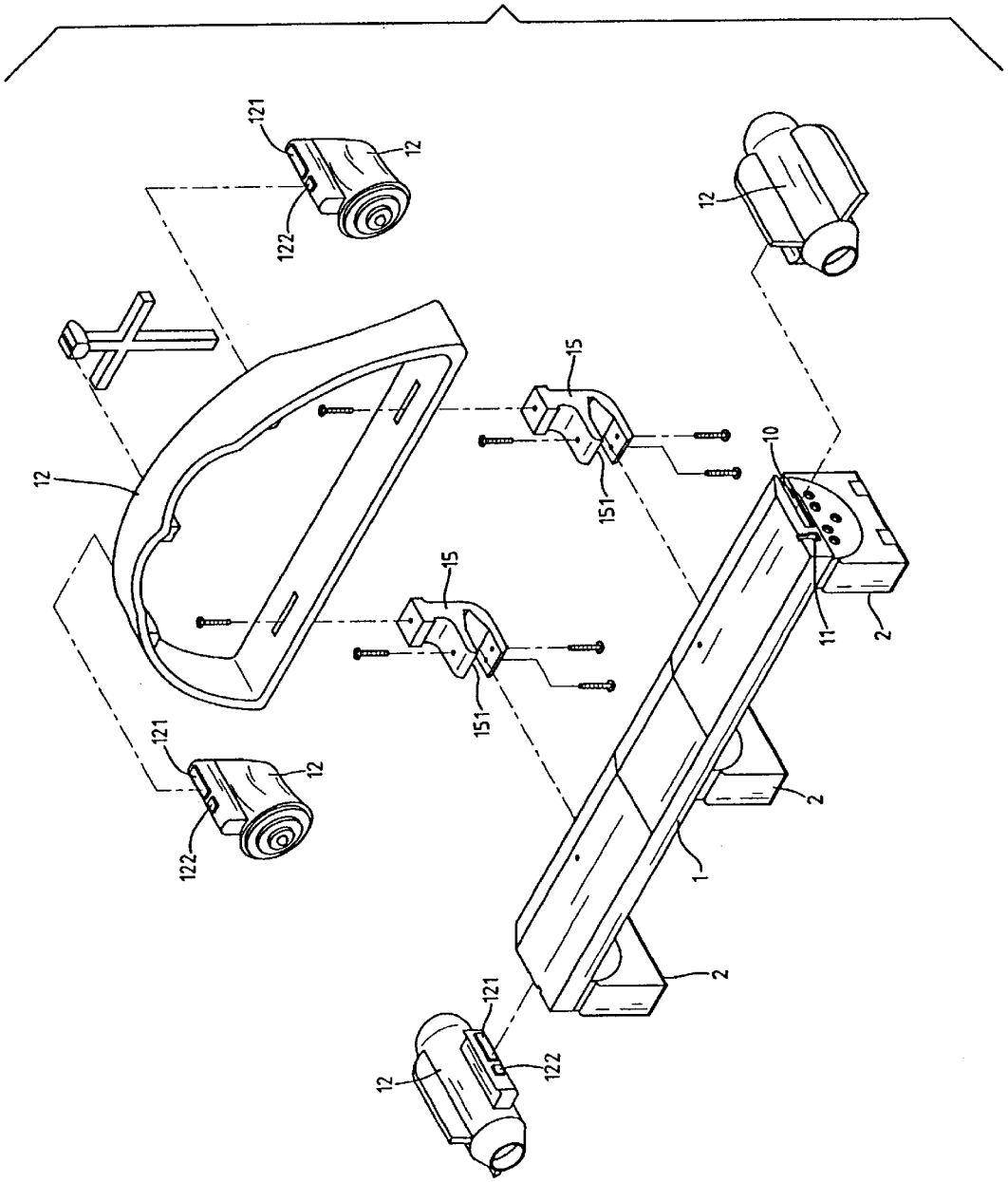

REAR WING STRUCTURE

FIELD OF THE INVENTION

The present invention is related to a rear wing structure specifically an optional add-on package, which permits ease of disassembly and durability in addition to adding a variety of decorative effects for aesthetic and stylish appearance.

BACKGROUND OF THE INVENTION

Generally due to the basic design of traditional automobiles turbulence is created below the windshield glass and above the trunk to cause instability at high speed. A vacuum state is formed under the trunk to cause the rear body to rise. Further, in cars with front engine, the center of gravity is located towards the front. Thus, when the car is turning, the car is pulled outwards due to centrifugal force. At high speeds, oversteering can occur. The industry seeks to solve the problem by adding a rear wing onto the trunk, so that a car travelling at high speed will be balanced by reducing turbulence, minimizing the vacuum area behind the car and pushing the car downwards.

However, the traditional rear wing lacks versatility in style and possesses only a single function. The lack of flexibility in replacement devalues the product.

Car decoration or interior decoration becomes important. It is not unusual to find that the decorative aspects become dominant over the functional performance.

SUMMARY OF THE INVENTION

The main objective of the present invention is to provide an improved rear wing structure. Basically, the rear wing has supporting stands with an adjustable angle of depression and elevation at the proper location (both sides and center) at the bottom. When the car is running, the optimum angle of depression and elevation can be attained to assure the balance for the center of gravity. In addition, the rear wing can be added with ornaments featuring personal style or fashionable decoration on the top or both sides, so its assembly comes with flexibility and convenience. The structure provides a rear wing with the basic function and aesthetic appeal.

BRIEF DESCRIPTION OF THE DRAWINGS

FIGS. 4A and 4B illustrate pivoting movements of components of the present invention.

FIG. 5 is a partially exploded view of an embodiment of the present invention.

DETAILED DESCRIPTION OF THE INVENTION

Figure 1:
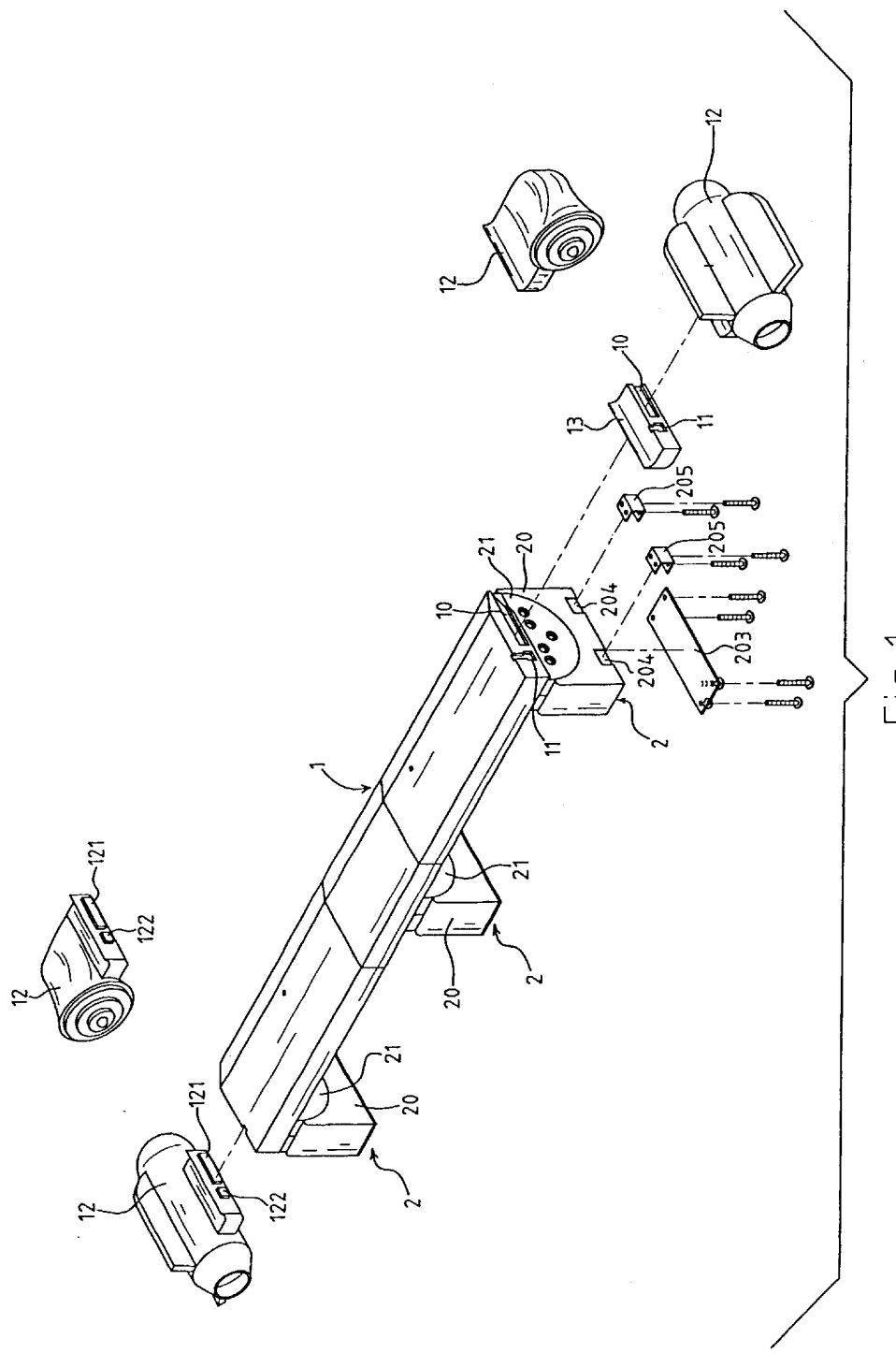
FIG. 1 is a partially exploded view of the rear wing in the present invention.

Please refer to FIGS. 1, 2, 3 and 4. In FIG. 1, the position for the improved rear wing in the present invention is the same as that for the traditional rear wing. It is installed onto the trunk at the rear edge and comprises a rear wing 1 and a set of supporting stands on both sides and in the middle thereof.

Figure 2:
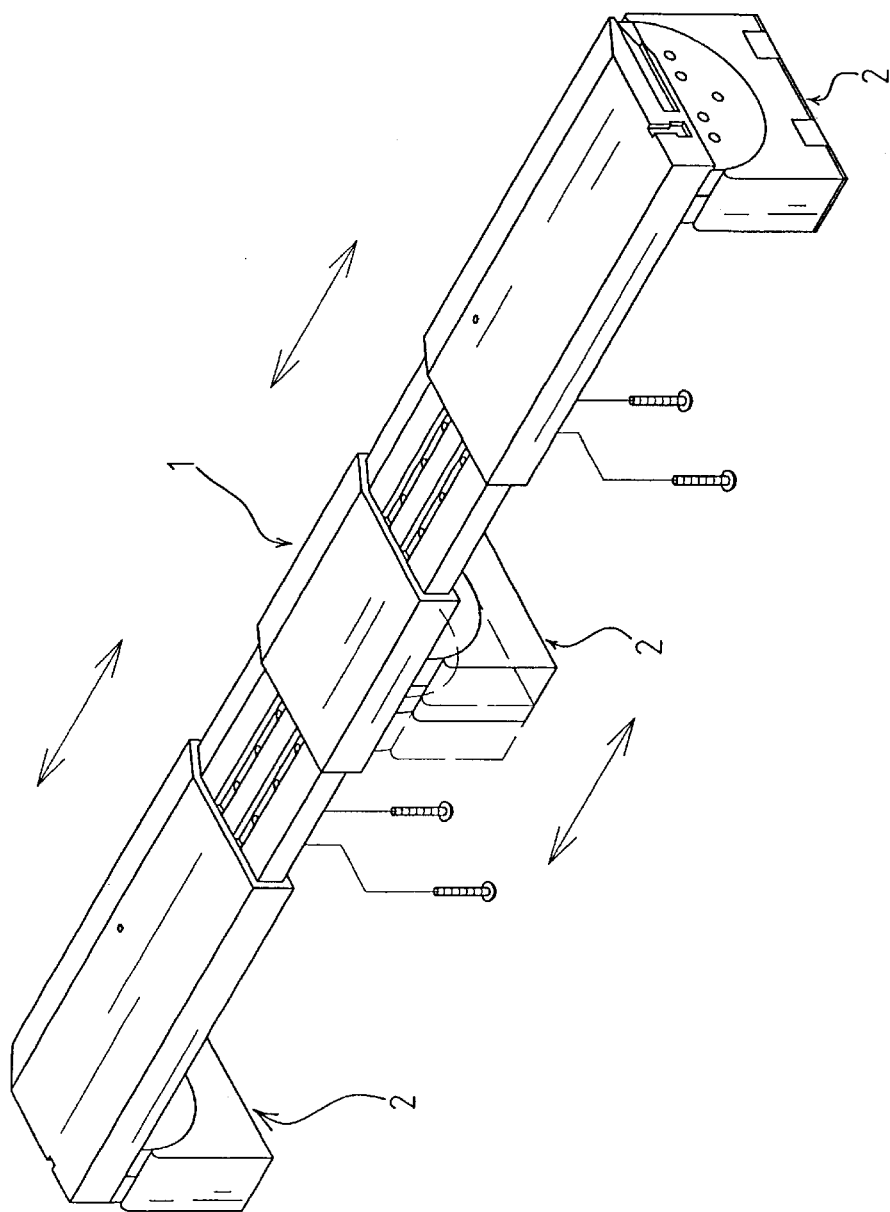
FIG. 2 shows the sliding movement of the rear wing in the present invention.
Figure 3A:
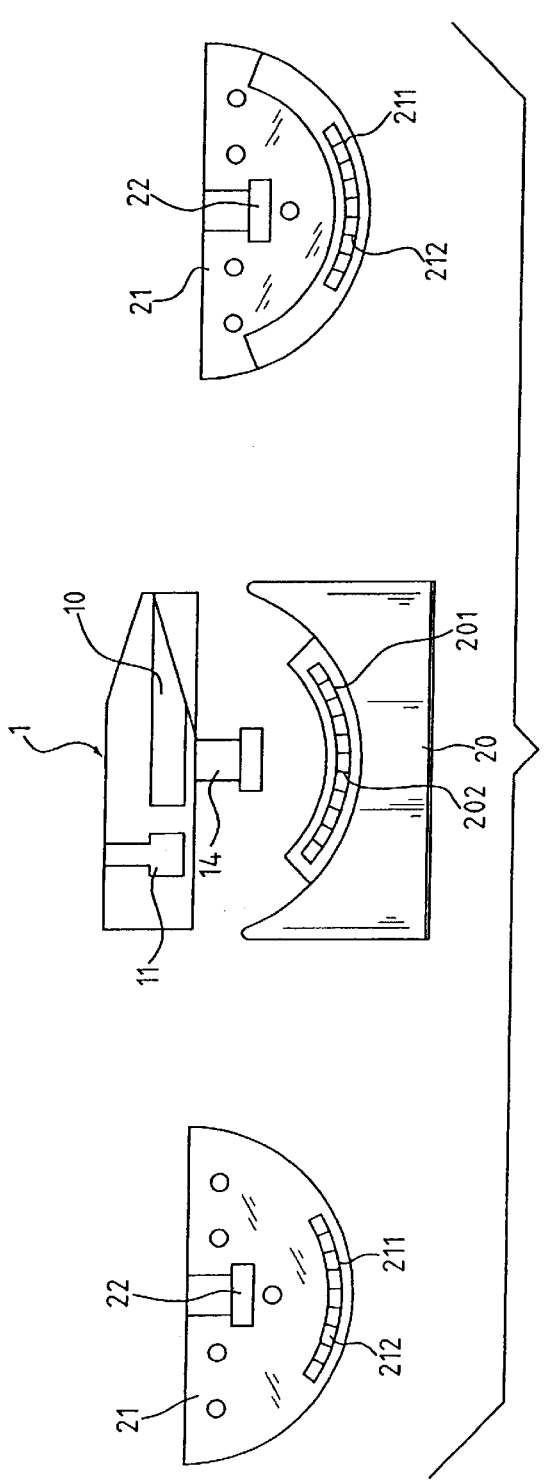
FIGS. 3A and 3B are planar side views of a partial structure of the present invention.
Figure 3B:
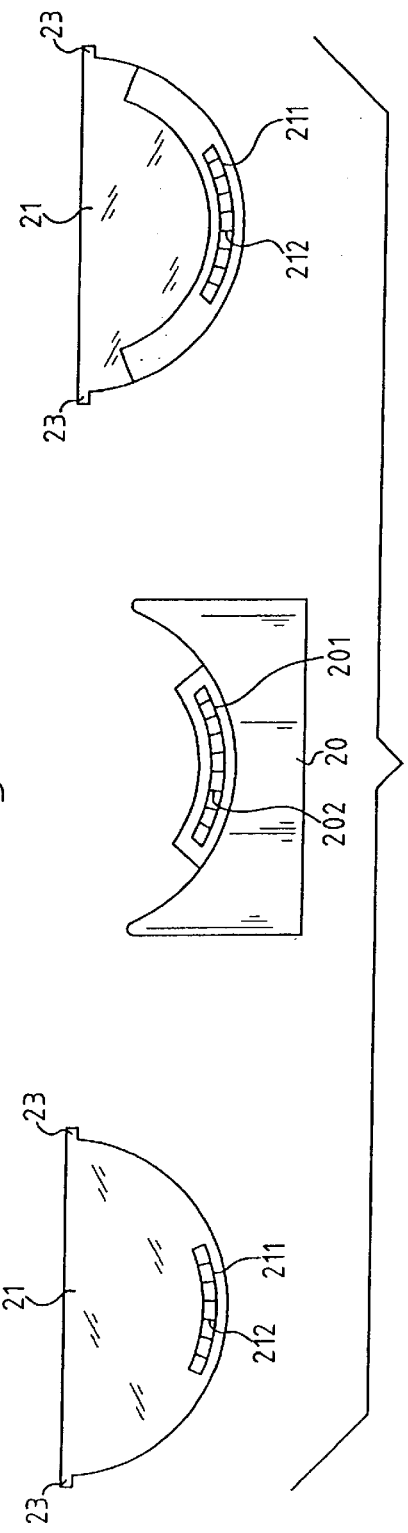

The rear wing 1 is a long board with special (flat) shape that has low drag coefficient and is extendible towards both sides (as shown in FIG. 2), permitting adjustment of its length for different car specifications. On both sides of the rear wing 1, there is a sliding groove 10 and a positioning hole 11 to facilitate combination of ornaments 12, which add to aesthetics and manifest personal style and taste. Further, the ornaments 12 have corresponding bulging rods 121 that place into the sliding groove 10 and elastic bulging blocks 122 to lock into the positioning hole 11. The combination of the rear wing 1 and the ornaments 12 can be realized by a connector 13, which similarly has a sliding groove 10 and positioning hole 11 on one side and a bulging rod 121 and bulging block 122 on the other side. Thus, the rear wing is made extendible and more suitable for use.

Outer supporting stands 2 are installed on both sides of the rear wing 1 and includes a concave fixation base 20 and two matching moving units 21. The fixation base 20 has an arch combination 201 near the center of the concave surface, and bulging rods 202 at equivalent distance inside the concave surface at both sides, and a thin plate 203 fixed onto the bottom. A pair of notch grooves 204 exist on the outer side and has a U-shape fixture 205 inside. The moving units 21 are composed of two adhering semi-spherical parts with auxiliary arch rods 211 having a convex surface close to the semi-spherical edge. Besides, there are bulging rods 212 on the surface corresponding to the above-mentioned bulging rods 202 at the arch combination 201, so connection is made through multiple-mode control (as shown in FIG. 4B). In addition, there is a pair of positioning grooves 22 above the moving units 21 to allow the combination pillar 14 in equal distance at the bottom of both sides of the rear wing 1 forming an integrated unit after insertion. The supporting stand 2 is adjustable for left and right shift to fit in different type of trunks (as shown in FIG. 4A).

The middle supporting stand 2 of the rear wing 1 comprises the same fixation base 20 as the above-mentioned supporting stand 2 and two matching moving units 21. There is an arch combination 201 with bulging rods 202 in equal distance in the middle of arch concave surface of the fixation base 20. Besides, there are auxiliary arch rods 211 for bulging rods 212 in equal distance at the edge of the moving units 21 to achieve the same multiple mode adjustment. There are bulging edges 23 on both sides of the moving unit 21, locked onto the bottom of the rear wing 1 through screws to form an integrated unit.

Figure 6:
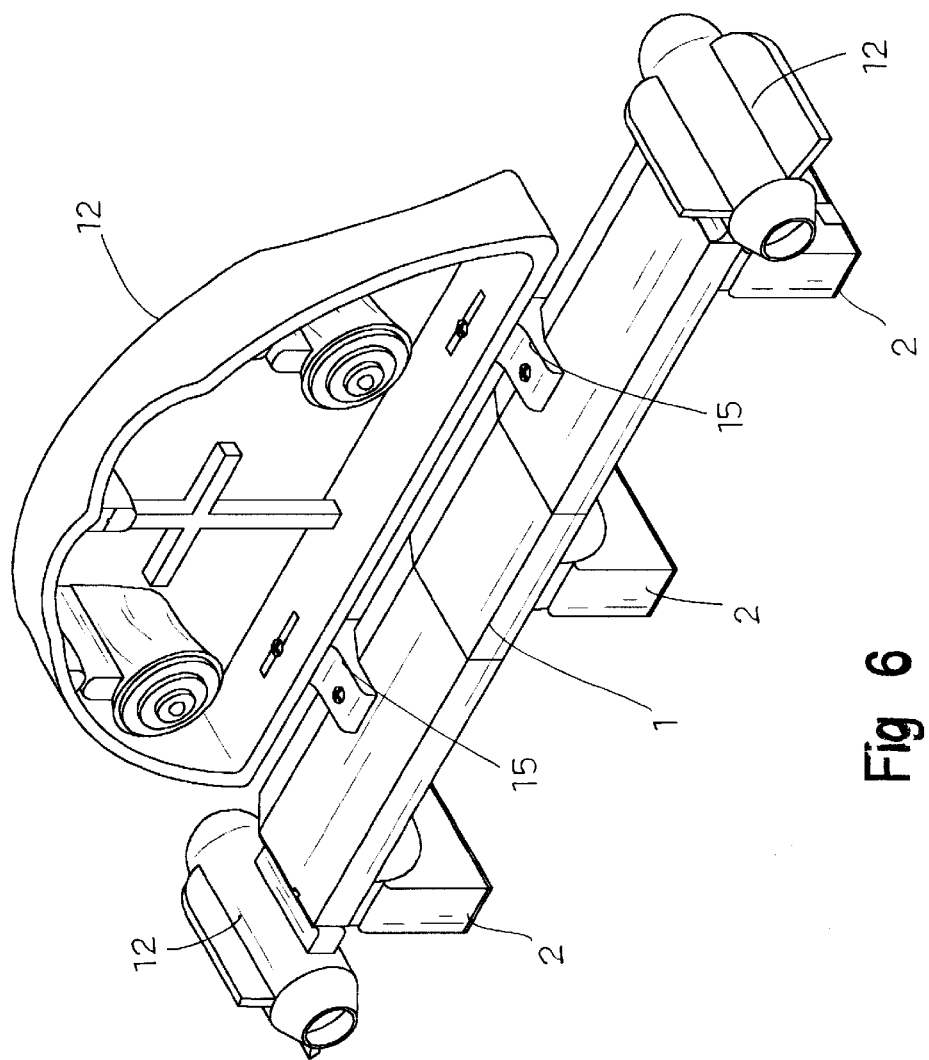
FIG. 6 is an assembled view of FIG. 5.
Figure 7:
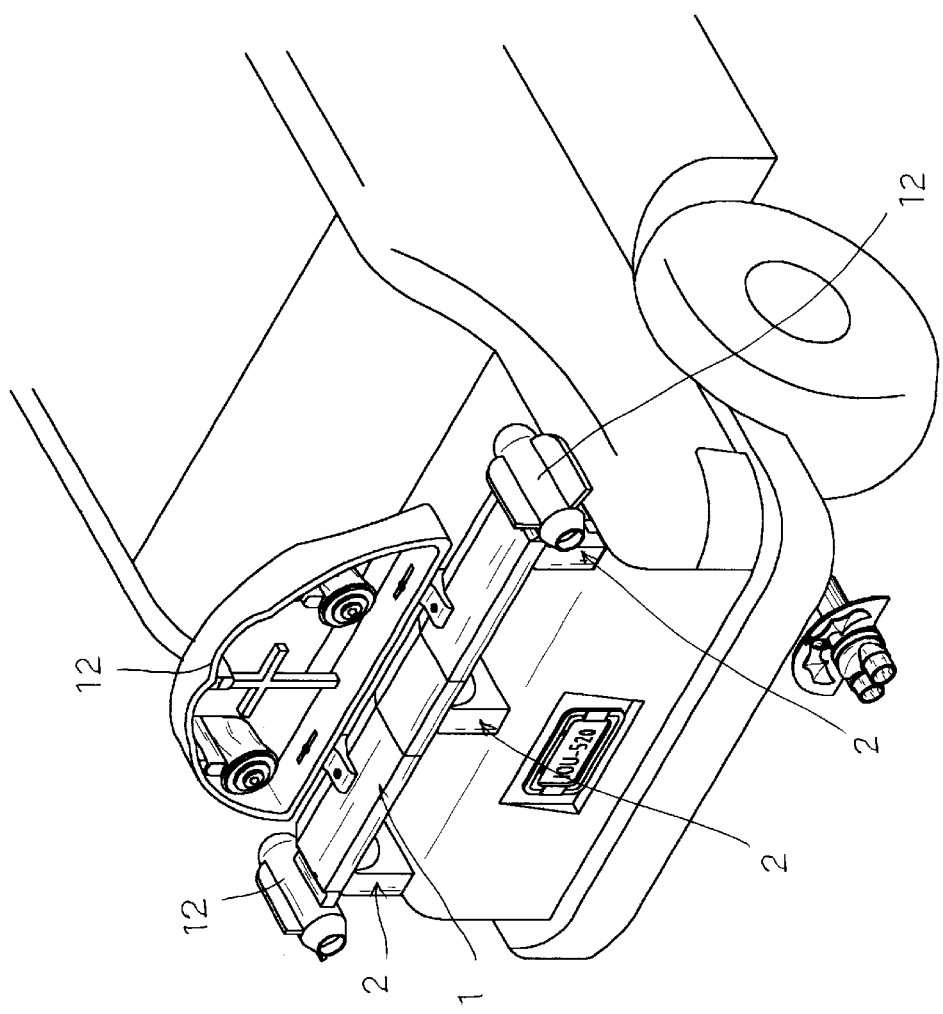
FIG. 7 illustrates an application of the device of FIG. 6.

Please refer to FIGS. 5, 6 and 7. During use, as shown in FIG. 5, the rear wing 1 can be added with ornaments 12 that can manifest personal style or add to the aesthetics. The ornaments 12 can be directly combined with the rear wing 1 on both sides or large semi-spherical ornaments can be placed onto the surface of the rear wing 1 through the positioning fixture 15 with opening 151. The large semi-spherical ornaments 12 can have small ornaments 12 therein to add decorative and aesthetic effect, as shown in FIG. 6. For use on a car, the rear wing 1 is placed at the proper location of the trunk by using screws to penetrate the thin plate 203 and the trunk cover and locking onto the bottom of the supporting stand 2. The positioning fixture 205 on one side clamps the supporting stand 2 and the trunk together with penetrating screws as shown in FIG. 7.

When the car is running at high speed, the wind speed is also relatively high. The rear wing 1 shifts downwards due to wind force. When the car speed increases, the pressure downwards increases and the rear wing angle tends to be flat. As a result, the running car is subject to appropriate downward pressure without serious drag and maintains stability. Besides, the personalized ornaments 12 on the rear wing 1 add to the aesthetic effect.

Figure 8:
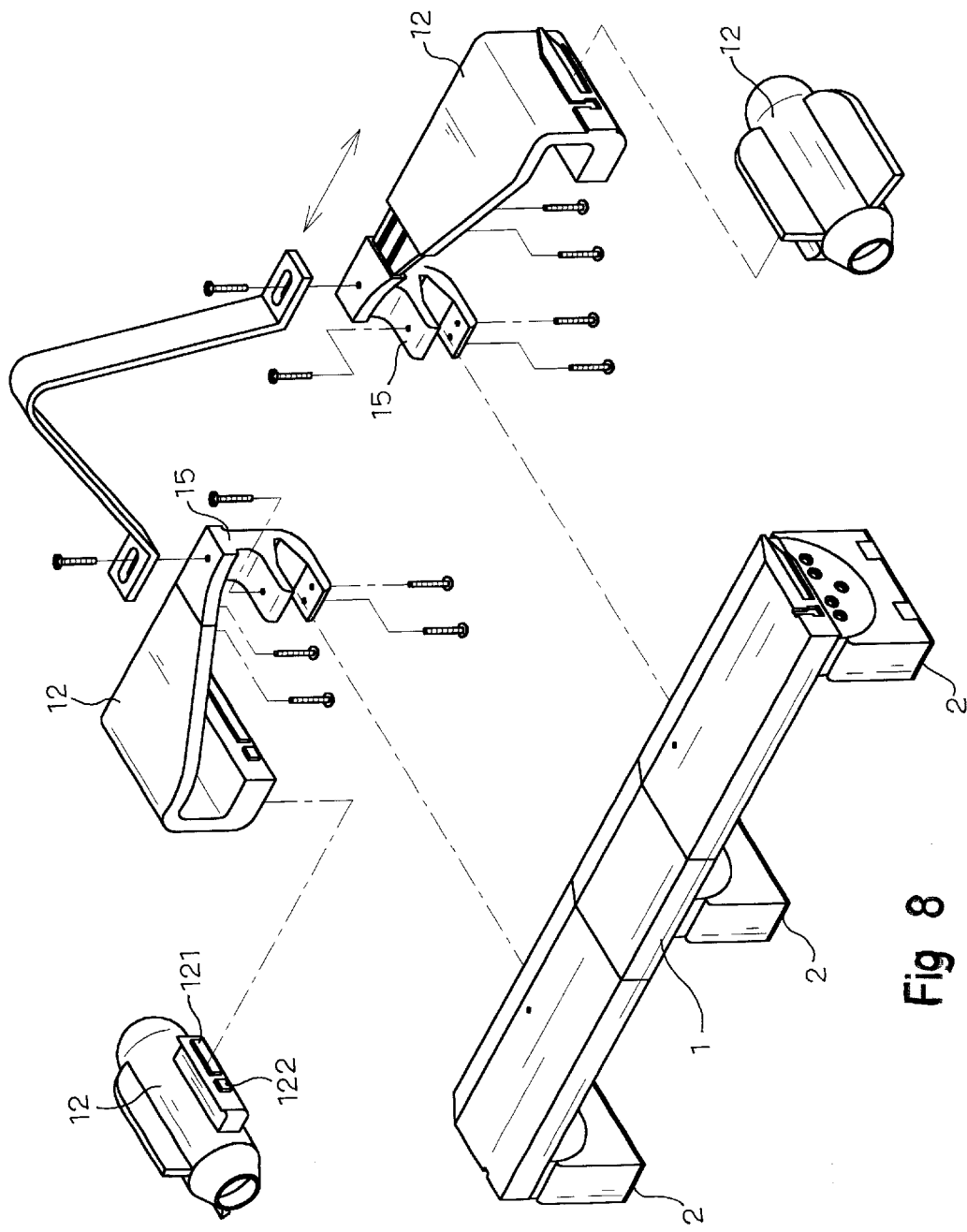
FIG. 8 is a disassembled view of another embodiment of the present invention.
Figure 9:
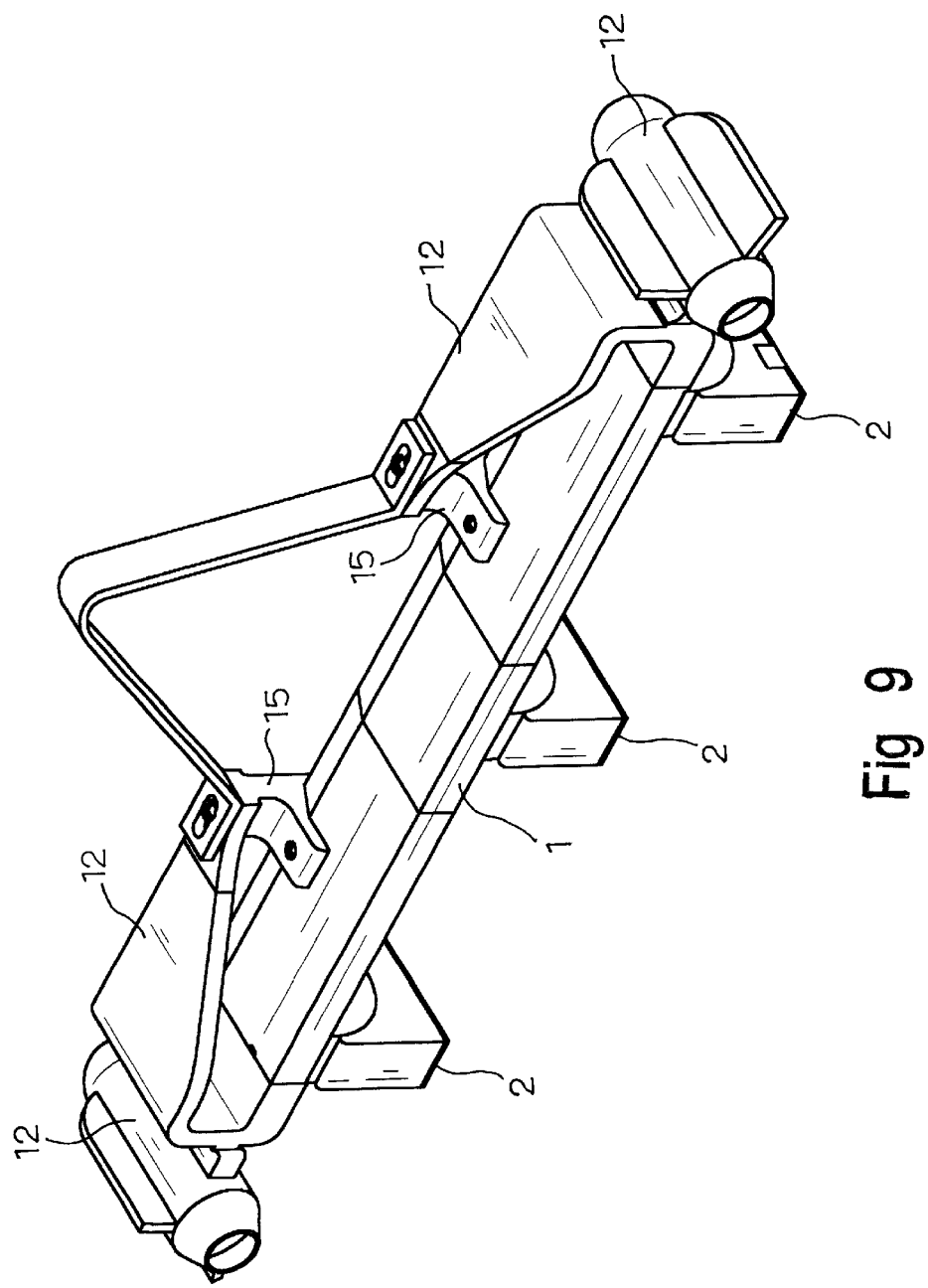
FIG. 9 is an assembled view of the device of FIG. 8.
Figure 10:
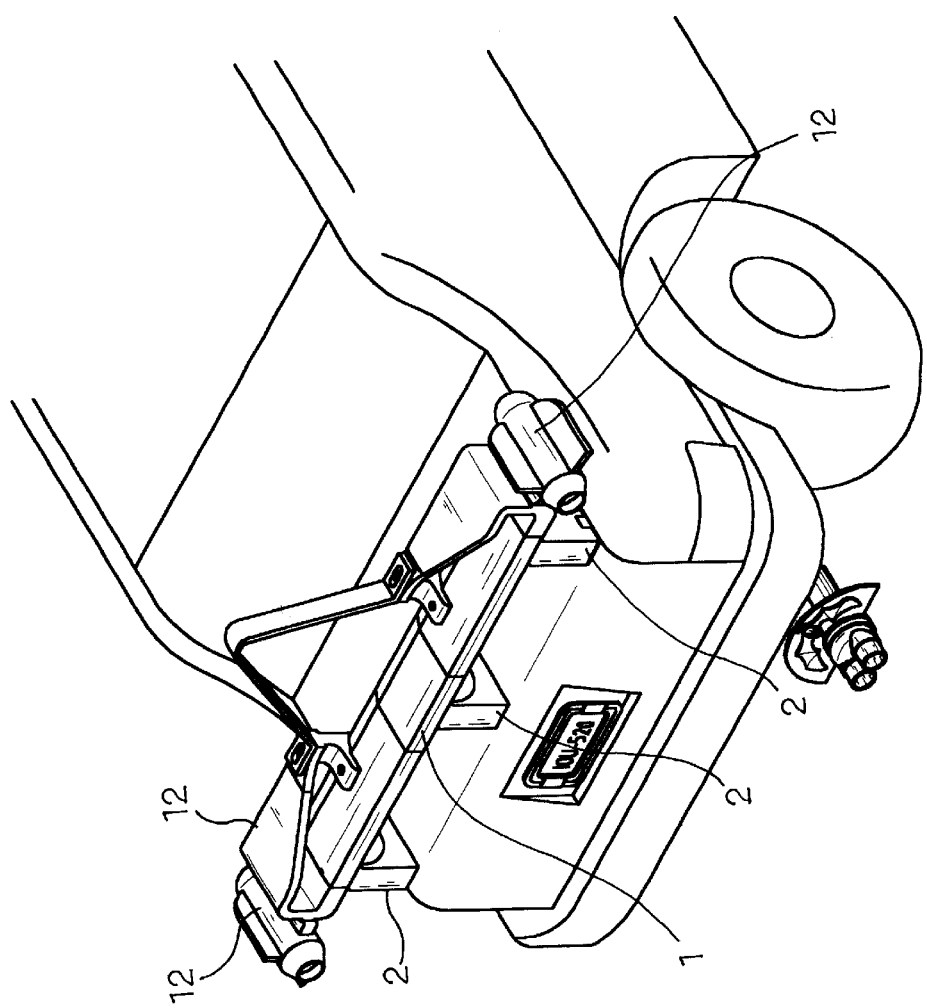
FIG. 10 illustrates an application of the device of FIG. 9.
Figure 11:
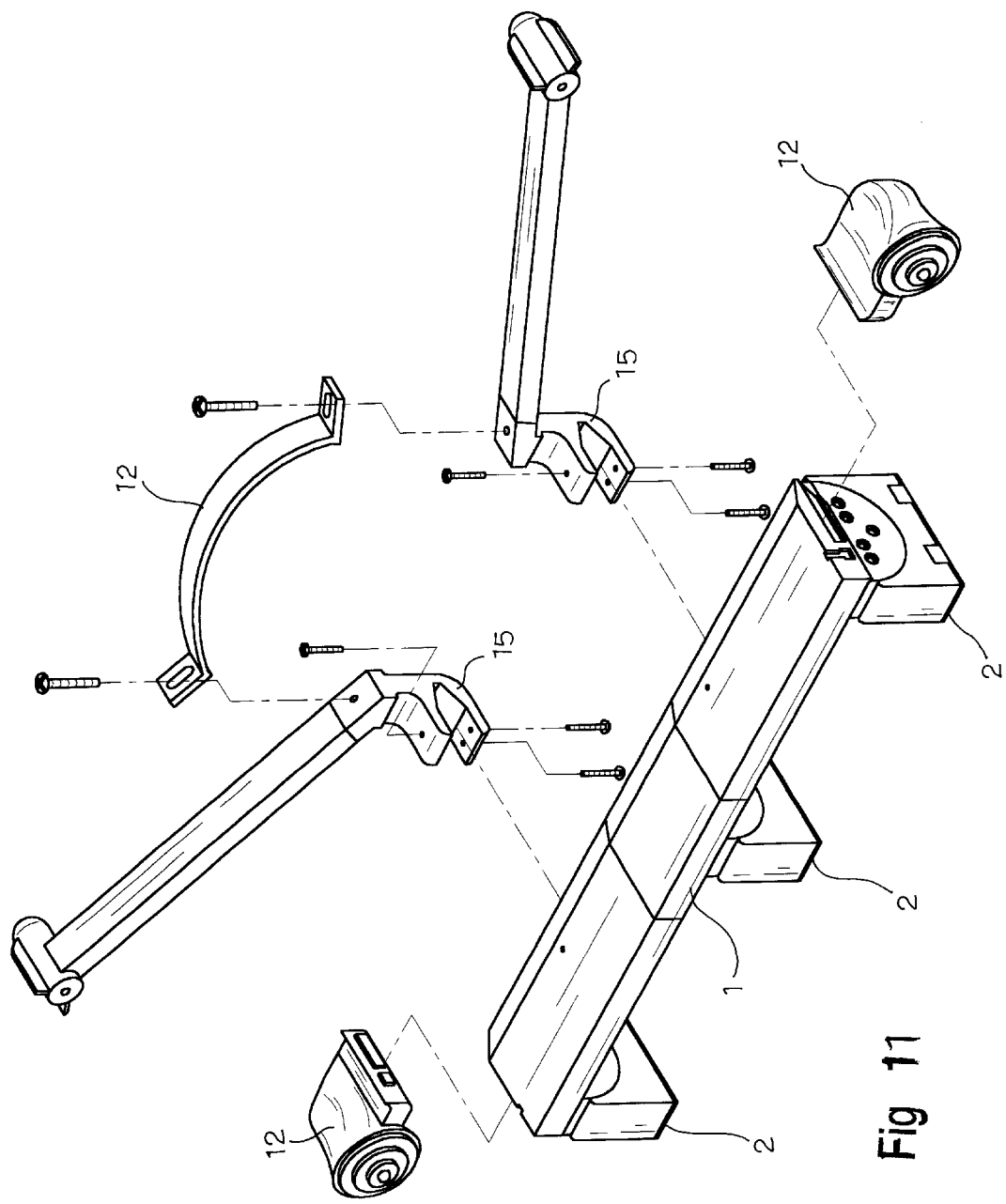
FIG. 11 is a disassembled view of yet another embodiment in the present invention.
Figure 12:
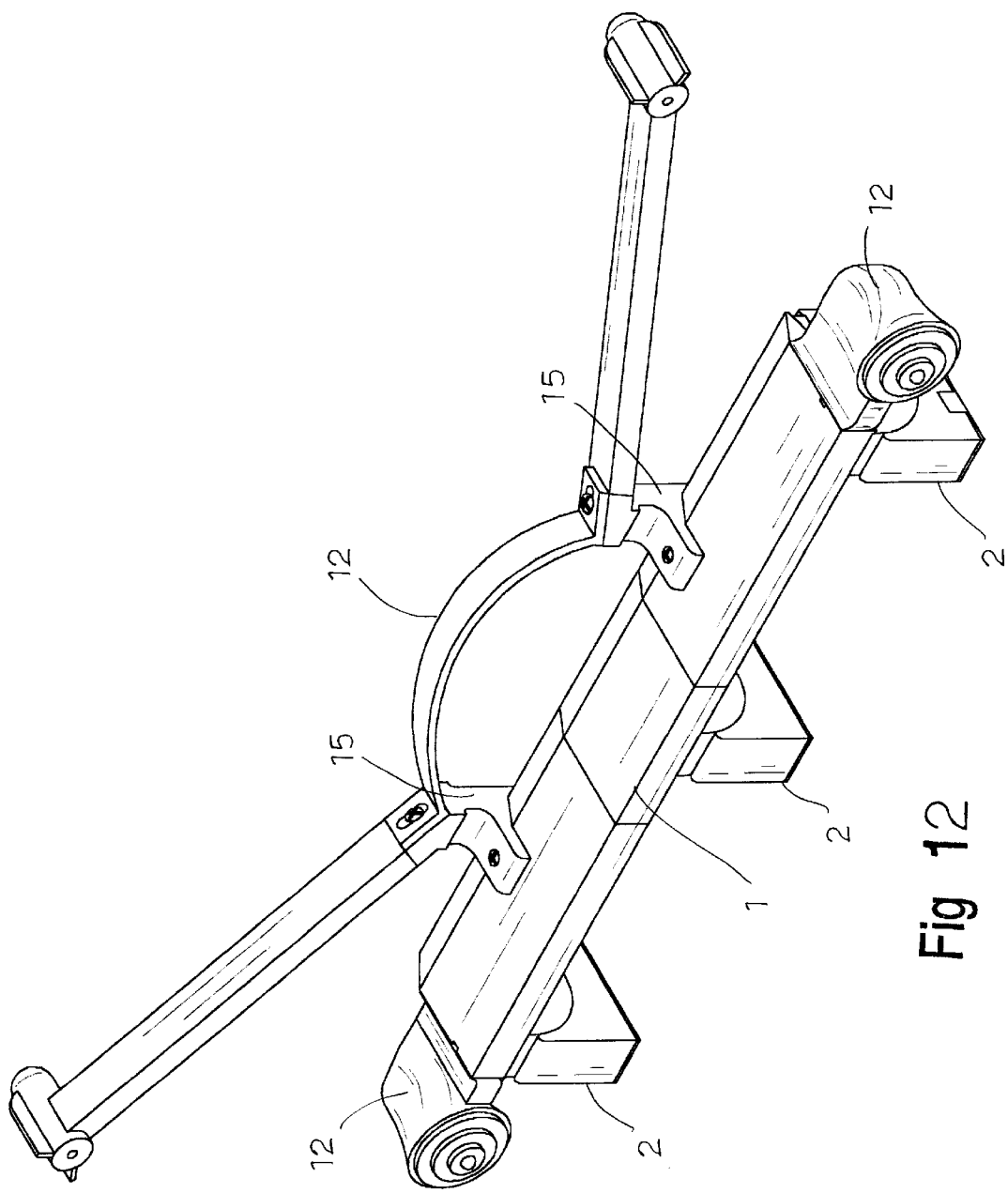
FIG. 12 is an assembled view of the device of FIG. 11.
Figure 13:
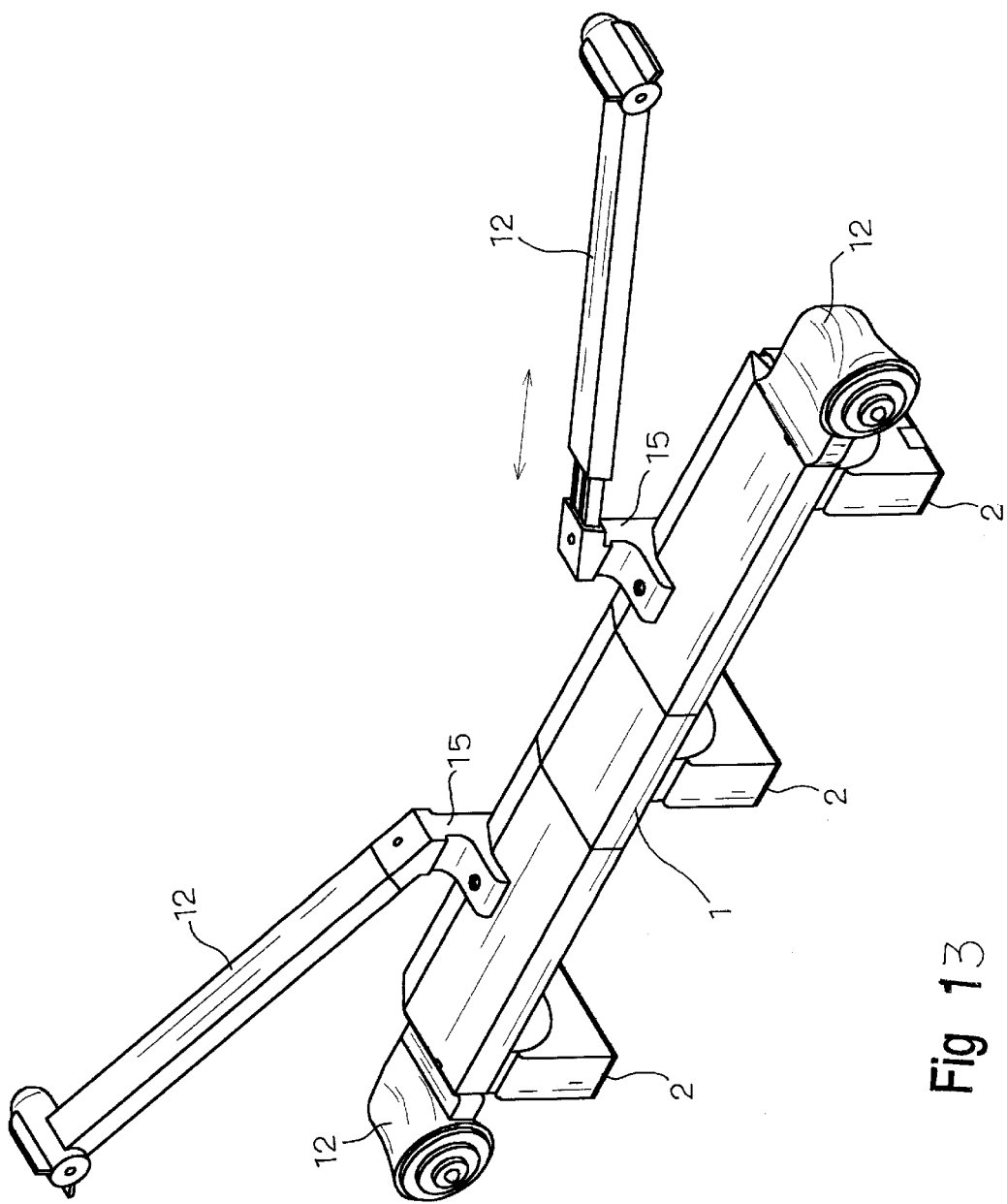
FIG. 13 illustrates the sliding movement of a part of the device of FIG. 12.
Figure 14:
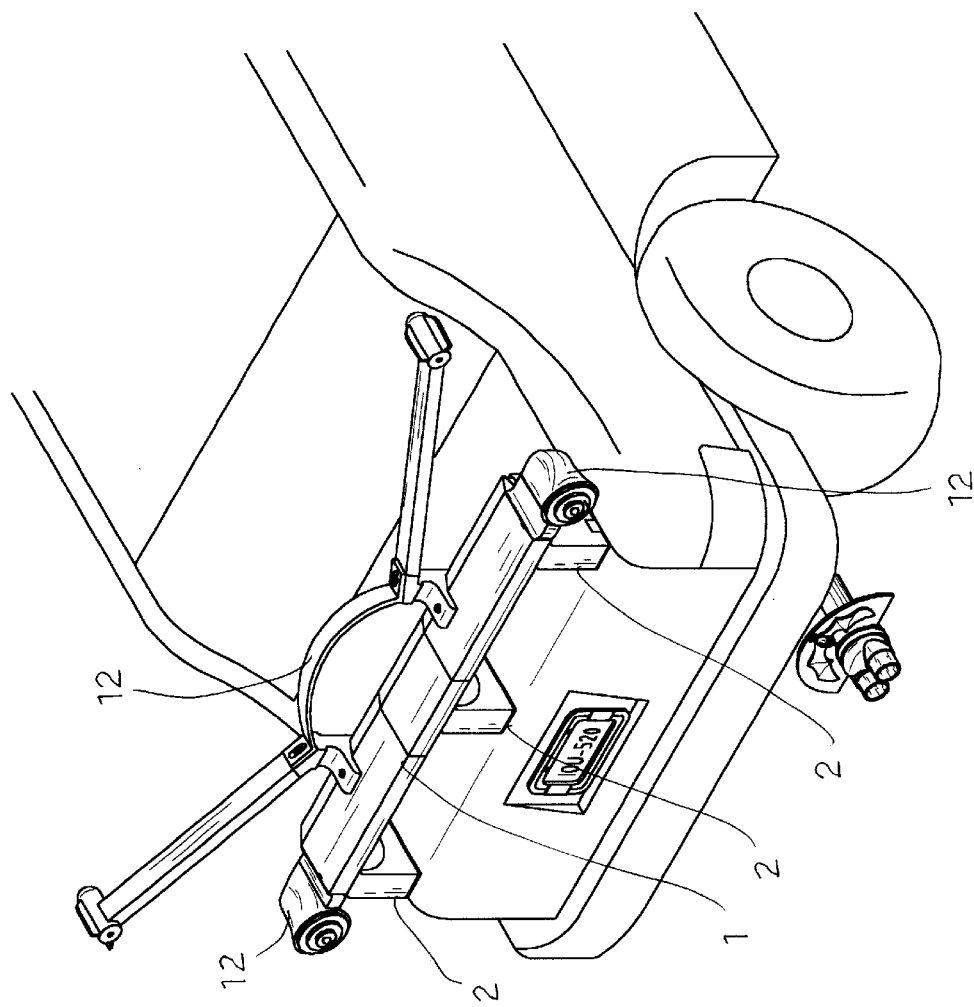
FIG. 14 illustrates an application of the device of FIG. 12.

Further, please refer to FIGS. 8, 9 and 10. In a preferred embodiment of the rear wing 1 with ornaments 12 in the present invention, the ornaments 12 adopts an L-shape extendible side wing with a positioning fixture 15 at one end and small ornaments 12 at the other end. Thus, a very personalized rear wing structure 1 is formed. As for the assembly mode on the car, it is the same as that mentioned above.

Further, please refer to FIGS. 11, 12, 13 and 14. In another preferred embodiment for the rear wing 1 with ornaments 12 in the present invention, the ornaments 12 are two inclining extendible rods connected by an arch rod in the middle. At one end of the rod, small ornaments 12 can be added, while at the other end a positioning fixture 15 and the rear wing 1 are combined to form a stylish structure.

Figure 15:
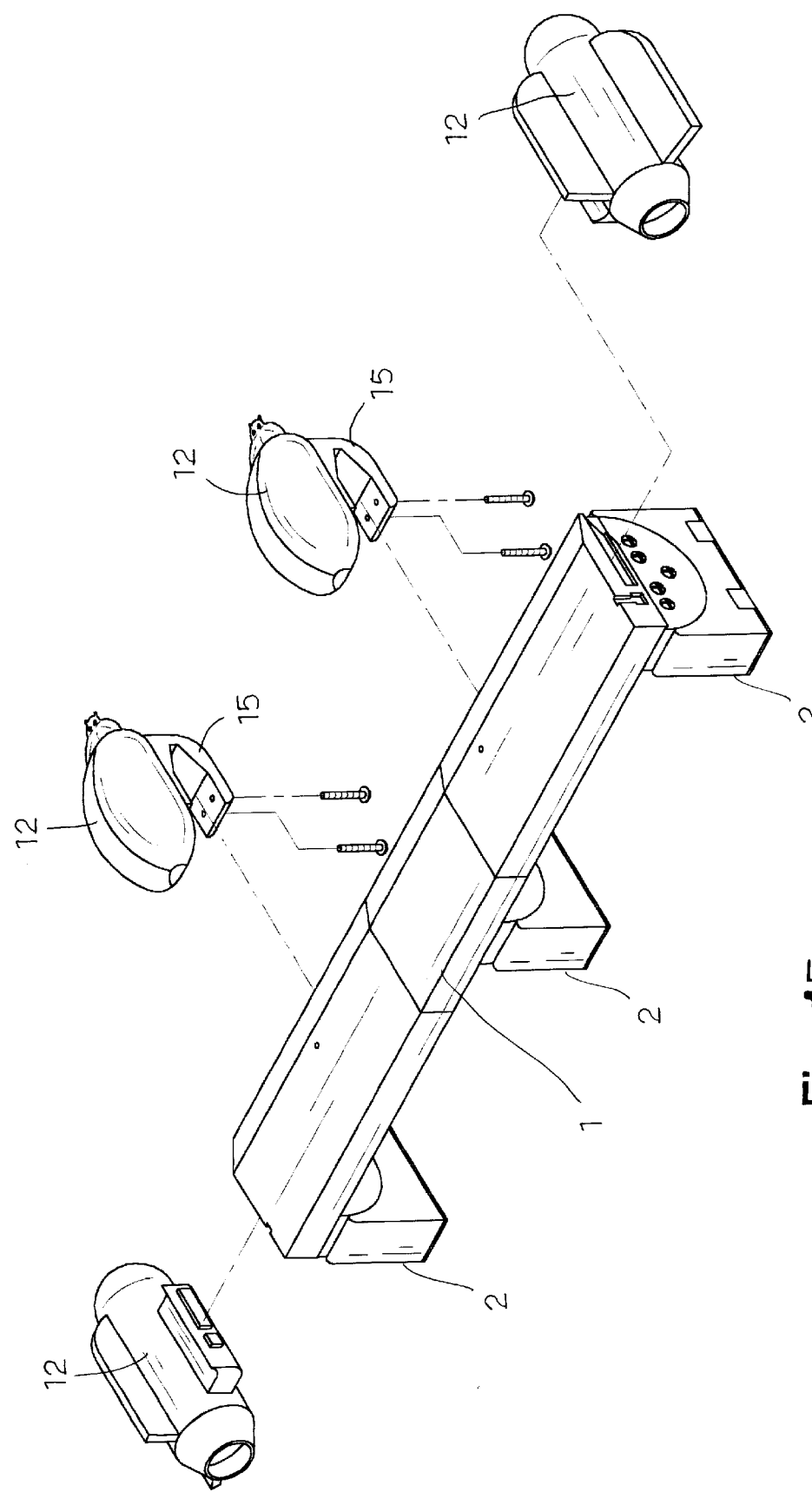
FIG. 15 is a dissembled view of another embodiment of the present invention.
Figure 16:
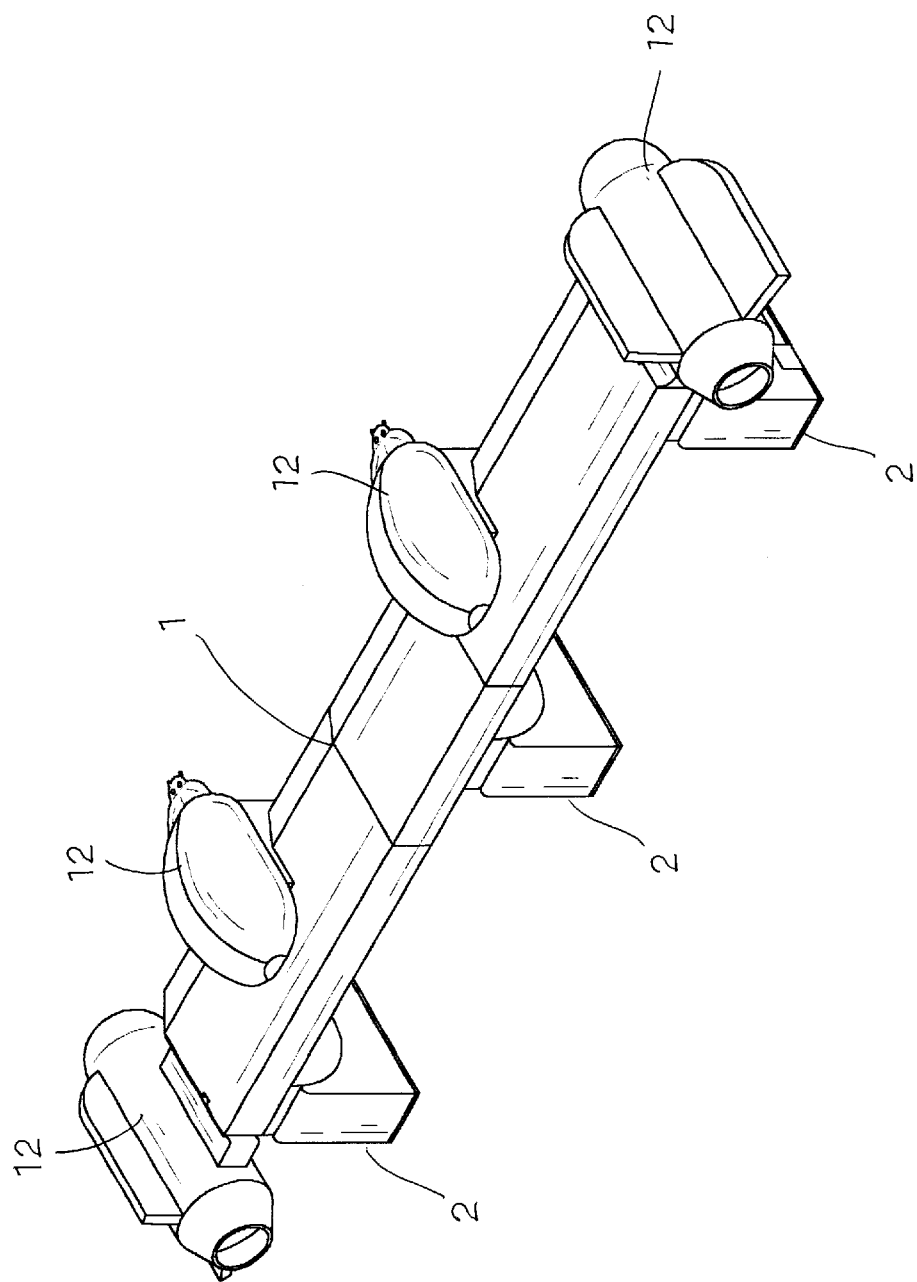
FIG. 16 is an assembled view of the device of FIG. 15.
Figure 17:
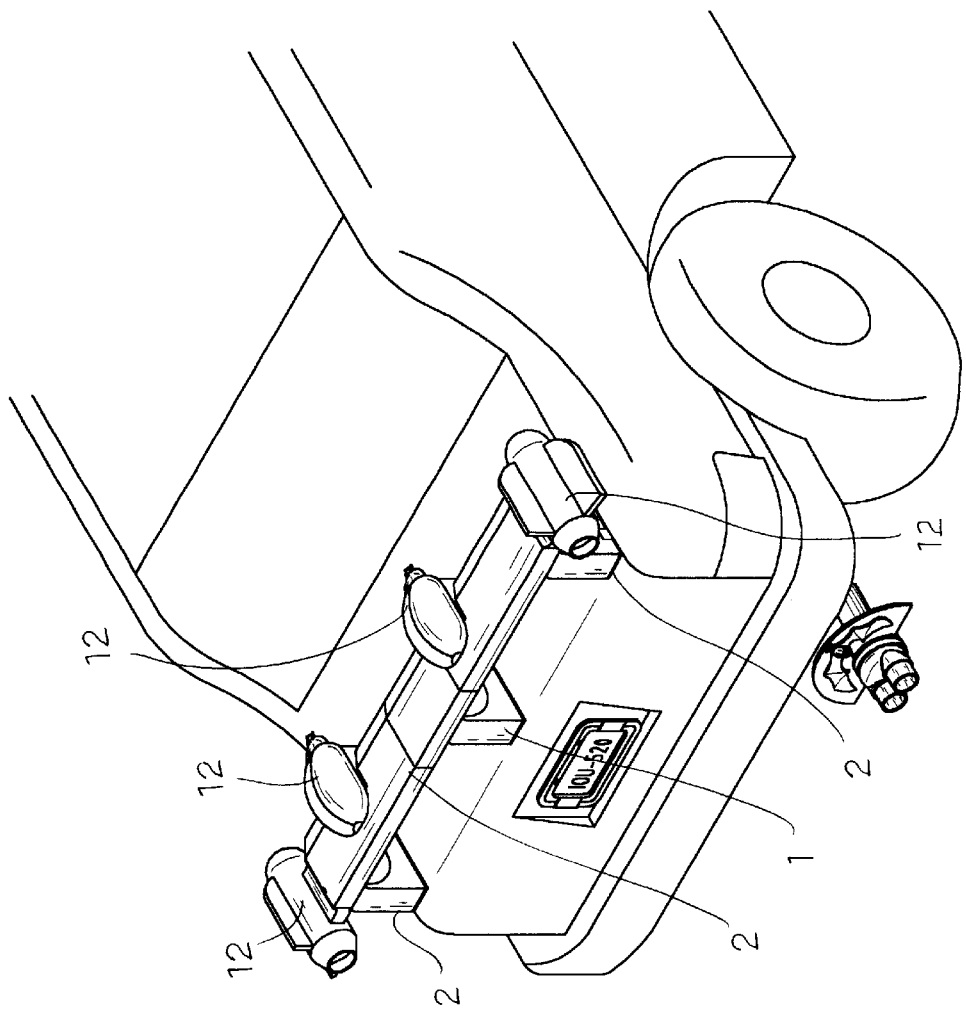
FIG. 17 illustrates an application of the device of FIG. 16.

Further please refer to FIGS. 15, 16 and 17. In another preferred embodiment for the rear wing 1 with ornaments 12 in the present invention, the simplest decoration is made by directly adding a number of small ornaments 12 onto the rear wing 1. The ornaments 12 are combined with the positioning fixture 15 and fixed onto the rear wing 1 at a proper position. Thus, a simple and personalized rear wing structure 1 is derived without a tedious assembly process. The rear wing 1 can with decorated with additional ornaments 12.

In addition, the above-mentioned rear wing 1 and ornaments 12 can be added with LEDs at the edge thereof or electroluminescent objects that refracts light and gives a warning effect at night.

Further, the positioning fixture 15 can adopt an L-shape single-plate and flat insertion structure in addition to a dual-plate mode with an opening 151. Screws are also used for fixation.

Figure 18:
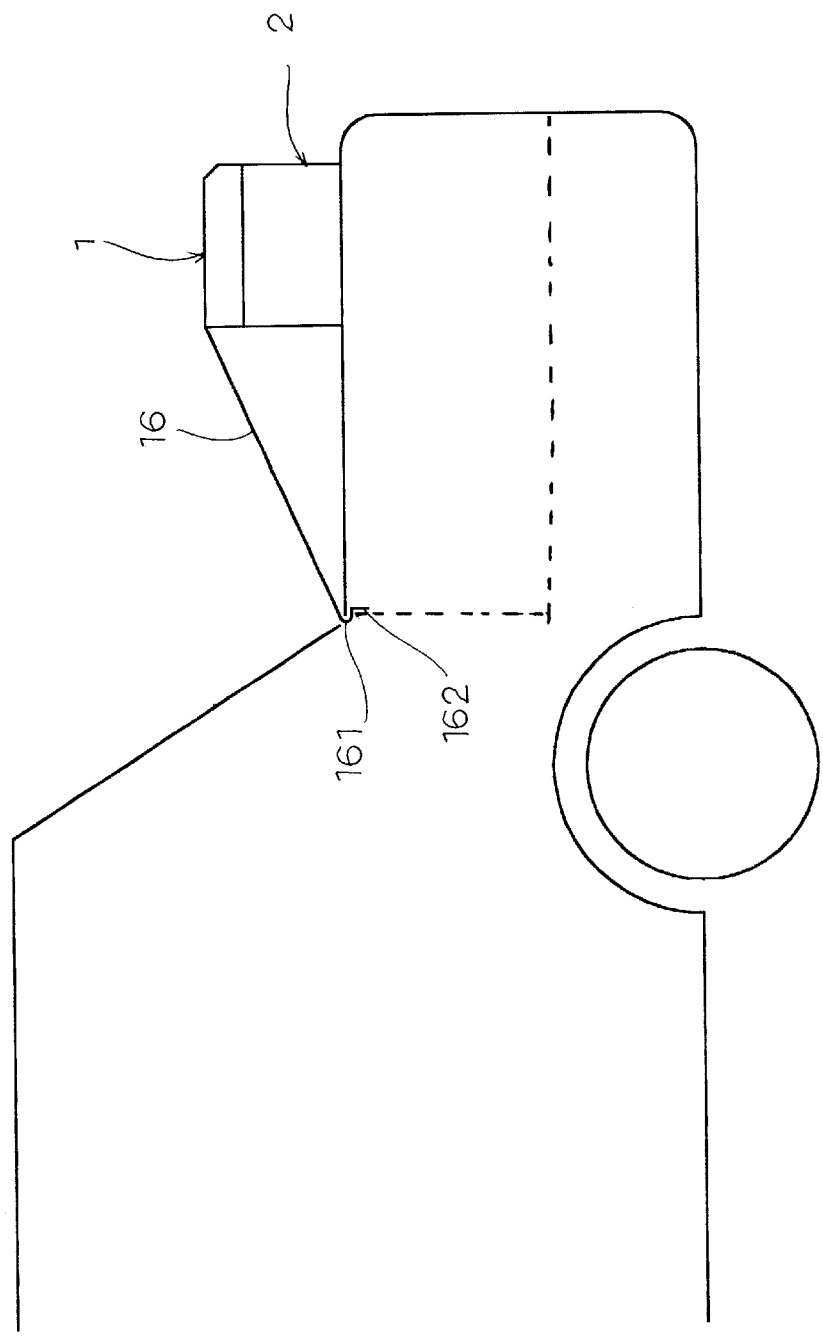
FIG. 18 illustrates an application of an embodiment in the present invention.

To enhance the stability for the rear wing 1 on cars, direct placement is used by installing two fixation rods for the pulling force 16, which has one end locked with the rear wing 1 and the other end having a curved section 161 that is to be inserted into the gap between the car body and the trunk. At the end of the curved section 161, a vertical stopper 162 is formed. Therefore, when the car initially moves or is accelerating, the curved section 161 will exert the pulling force to the rear wing 1 to reduce the drag. When the car is decelerating or stops, the stopper 162 provides the rear wing 1 with a certain degree of blocking force and reduces the reaction as shown in FIG. 18.

It is known from the above description that the improved rear wing structure in the present invention is designed to be adjustable for length for different car specifications. The rear wing can be added on both sides or in the middle with ornaments featuring personal style or fashionable decoration with relative ease. In addition to the basic performance of the rear wing for balancing and safety, the present invention also provides added aesthetics.

What is claimed is:

1. A rear wing structure adapted to be installed on a trunk of a car at a position close to an edge thereof, comprising:

a rear wing having a sliding groove and a positioning hole at both sides thereof for attaching ornaments, the ornaments having corresponding bulging rods configured to slide into the sliding groove and elastic bulging blocks configured to be forced into the positioning hole;

a supporting stand at both sides and in the middle of the rear wing, composed of a concave fixation base and two matching semi-spherical moving units; and the rear wing includes an inner portion slidably received in an outer portion for telescoping movement.

2. The rear wing structure of claim 1, wherein the rear wing is a long board with a flat shape having a low drag coefficient.

3. The rear wing structure of claim 1, further comprising a connector having a sliding groove and a positioning hole at one side thereof and bulging rods and bulging blocks configured to serve an ornament to the rear wing.

4. The rear wing structure of claim 1, wherein an arch combination with concave surfaces at both sides thereof is installed near a center of an arch concave surface for a fixation base of supporting stands, the bulging rods equidistantly positioned on the concave surface and a thin plate locked at a bottom thereof, on an outside surface thereof is a pair of corresponding notch grooves with U-shape positioning fixture at an edge of the semi-spherical units of the moving units, there are auxiliary arch rods with a convex surface, and the bulging rods are equidistantly positioned on the moving units.

5. The rear wing structure of claim 1 or claim 4 wherein matching positioning grooves are positioned on the moving units to provide a combination at a bottom of both sides of the rear wing and form an integrated unit, and the supporting stands can be adjustable for right and left shifting for different car specifications.

6. The rear wing structure of claim 1, wherein the supporting stand in a center of the rear wing is composed of a fixation base and the moving units, the fixation base has arch combination of bulging rods in equal distance at a place near a center of concave surface and auxiliary arch rods of bulging rods on a surface in equal distance at an edge of the semi-spherical moving units, thus a multiple mode control is derived, and the moving unit has bulging edge at both ends locked onto a bottom of the rear wing via screws to form an integrated unit.

* * * * *